T. McG. AIKEN.
SINK STRAINER.
APPLICATION FILED MAY 7, 1913.

1,093,342.

Patented Apr. 14, 1914.

WITNESSES

INVENTOR
Thomas McG. Aiken
By H. W. Stevenson
ATTORNEY

UNITED STATES PATENT OFFICE.

THOMAS McG. AIKEN, OF PITTSBURGH, PENNSYLVANIA, ASSIGNOR OF ONE-THIRD TO CHARLES D. KUHNS, OF KNOXVILLE, PENNSYLVANIA, AND ONE-THIRD TO ERNEST C. MULL, OF PITTSBURGH, PENNSYLVANIA.

SINK-STRAINER.

1,093,342.  Specification of Letters Patent.  Patented Apr. 14, 1914.

Application filed May 7, 1913. Serial No. 766,055.

*To all whom it may concern:*

Be it known that I, THOMAS McG. AIKEN, a citizen of the United States, residing at Pittsburgh, in the county of Allegheny and State of Pennsylvania, have invented a certain new and useful Improvement in Sink-Strainers, of which the following is a specification.

My invention is designed primarily as a removable straining member to be attached to the apertured cover of a sink drain or outlet orifice of any similar device performing the functions of a sink or drain, whereby the waste or foreign matter, collected at this discharging point, will lodge on the said member and can be easily and quickly conveyed away.

My device, which is preferably constructed of metal, provides a convenient and sanitary means for collecting and removing all waste matter that does not pass through the perforations formed in said removable strainer, the novel formation also rendering it applicable as a scraper or shovel when cleaning out the sink. Said member will also be useful in scraping pans, pots, or other vessels, and in general will prove advantageous as a handy kitchen utensil.

In the accompanying drawing I have shown one embodiment of my invention, which is merely illustrative of the principle involved, and I do not limit myself to the exact configuration disclosed in said drawing, but reserve the privilege of altering the construction in such a way as to confine it within the scope of the appended claims.

Figure 1:
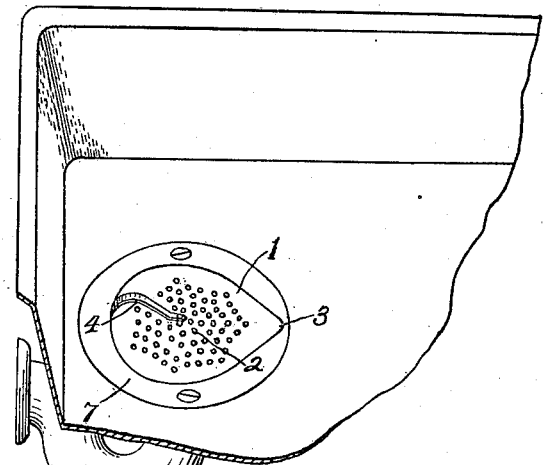
Figure 2:
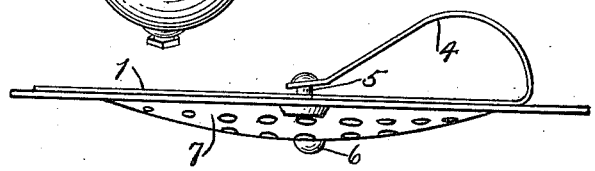
Figure 3:
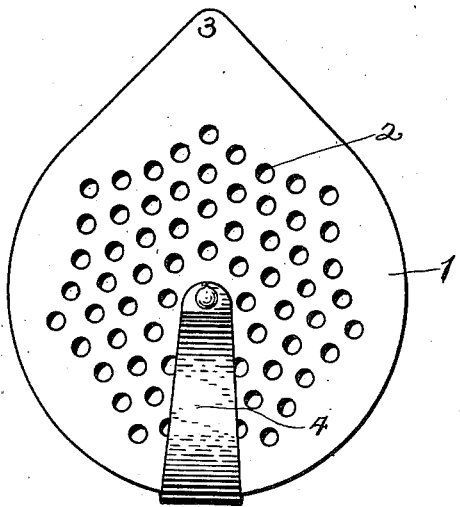
Figure 4:
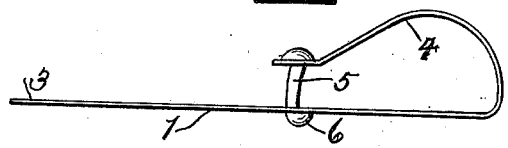

Referring then to said drawing Figure 1 is a fragmental view in perspective of the discharge end of an ordinary sink, showing my device as applied over the perforated cover of the drain pipe. Fig. 2 shows an edge view of the strainer and cover in their locked relationship with each other. Fig. 3 shows a plan view of the device, and Fig. 4 an edge view of the same.

The body portion of the device, which can be of any desired and selected material and configuration, is designated by the numeral 1, and is here presented as a flat disk of a circular design having a predetermined plurality of apertures 2 formed therein, and involving a preferably semi-pointed snout 3, which portion is hereinafter designated as the front or forward part of the device.

At the opposite, or what I term as the rear portion, is provided a resilient actuated extension or tongue 4, preferably integral with the main body 1, which is bent back over and raised above the plane of said body, its free end reaching approximately to and above the axial center of said body. This extension carries a rigidly positioned depending stem 5, which projects through one of the apertures provided in the body 1, said stem terminating in a rearwardly projecting hook 6. This said member 4 also serves as a handle for manipulating the strainer.

In applying my herein described device over the apertured permanent cover 7 of the sink drain the free end of the resilient handle 4 is depressed, thereby forcing the stem portion 5 through one of the apertures formed in said cover, and when pressure is released the spring member 4 will react, the hook 6 engaging the under surface of the metal part surrounding said aperture, as shown in Fig. 2. The continual upward pull exerted on the stem 5 incidental to the spring nature of the member 4, will be sufficient to retain said hook in close engagement with the under surface of the cover 7, thereby locking the straining member in position. When desiring to release the strainer from its locked attitude the free end of the extension part 4 is again depressed, and at the same time a slight forward pressure is exerted, which will release the hook from its contact with the cover, when the device will be free for removal.

Various other uses can be found for this device, such for instance as a handy means to scrape pots, pans, and kindred kitchen utensils, the semi-pointed snout portion being utilized to dislodge any closely adhering matter from crevices or corners, while the rounded edge also serves a useful purpose, the whole implement being conveniently portable by means of the extension or handle 4.

The perforations in the said strainer will preferably be of a somewhat less area than those formed in the fixed cover 7, guarding the inlet to the drain pipe, in order that the finer waste materials introduced into the sink may be prevented from entering said drain.

What I claim as my invention is:

1. In combination with the fixed apertured cover for a sink drain, a portable perforated straining member of a disk formation to seat over and contact with the cover, said disk involving a spring actuated tongue or extension bent back over and raised above the body portion, the free end of said extension being depressible, and a stem carried by said extension which passes through the apertured body, the lower extremity of said stem terminating in a hook adapted to contact with the under side of said apertured cover and releasably lock said member to the cover.

2. A portable perforated straining and scraping member involving a spring actuated tongue or extension bent back over and raised above the plane of the body portion, the free end of said extension being depressible and a stem carried by said extension which passes through the apertured body, the lower extremity of said stem terminating in a hook.

In testimony whereof, I affix my signature in the presence of two witnesses.

THOMAS McG. AIKEN.

Witnesses:
C. D. KUHNS,
E. C. MULL.

Copies of this patent may be obtained for five cents each, by addressing the "Commissioner of Patents, Washington, D. C."